United States Patent [19]

Thissen

[11] Patent Number: 4,522,714

[45] Date of Patent: Jun. 11, 1985

[54] WATER TREATMENT APPARATUS

[75] Inventor: Christopher P. Thissen, Austin, Minn.

[73] Assignee: Walker Process Corporation, Aurora, Ill.

[21] Appl. No.: 552,264

[22] Filed: Nov. 16, 1983

[51] Int. Cl.³ .............................................. C02F 3/06
[52] U.S. Cl. .................................... 210/150; 261/92; 261/120
[58] Field of Search ................ 261/92, 120; 210/150, 210/151, 402

[56] References Cited

U.S. PATENT DOCUMENTS

| 1,971,796 | 8/1934 | Scott | 261/92 |
|---|---|---|---|
| 2,657,027 | 10/1953 | Marion | 261/92 |
| 3,315,948 | 4/1967 | Martin | 261/92 |
| 3,658,305 | 4/1972 | Newtson | 261/92 |
| 3,759,495 | 9/1973 | Boler et al. | 261/92 |
| 3,799,515 | 3/1974 | Geerlings | 261/92 |
| 4,115,268 | 9/1978 | Thissen | 210/150 |
| 4,287,063 | 9/1981 | Stenzel | 210/402 |

Primary Examiner—Benoit Castel
Attorney, Agent, or Firm—Marshall, O'Toole, Gerstein, Murray & Bicknell

[57] ABSTRACT

A waste water treatment apparatus with a tank through which waste water flows, a rotary biological contactor in the tank with an annular plastic media fixed on a buoyant drum or tubular shaft providing buoyancy to which maintains immersion to the topmost peripheral portion of the drum, mechanical bearings to stabilize the contactor in the water and a drive connected to rotate the contactor.

12 Claims, 7 Drawing Figures

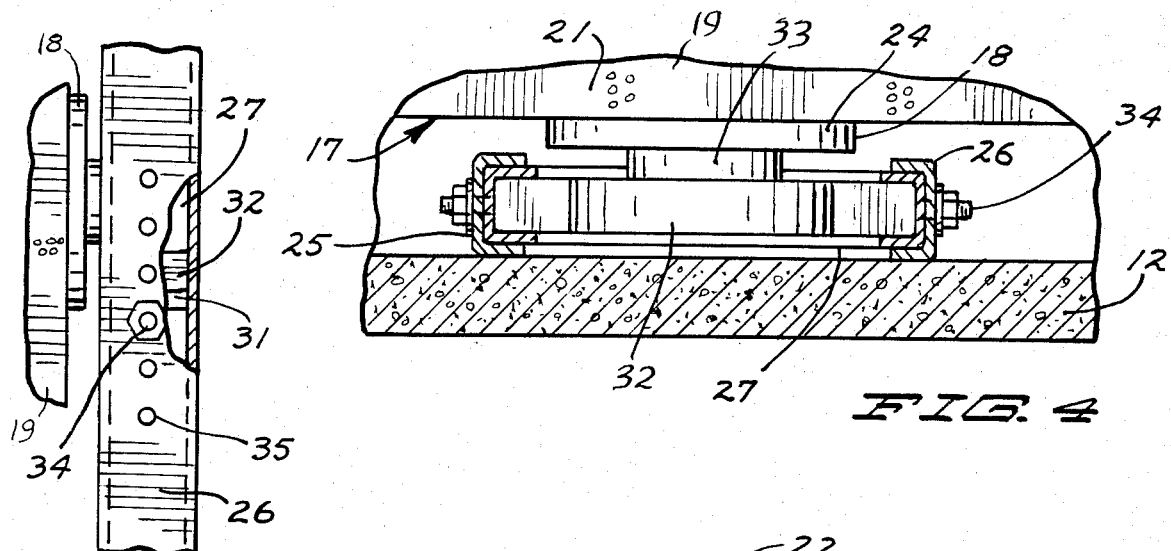
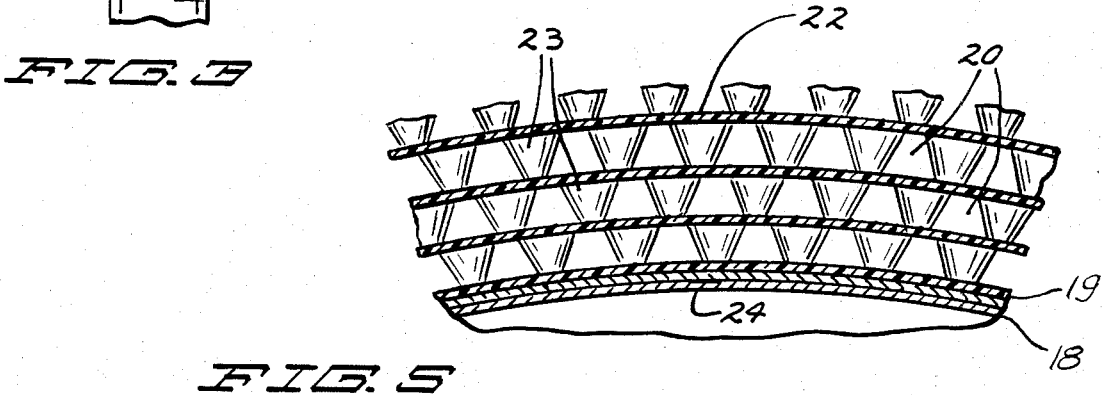
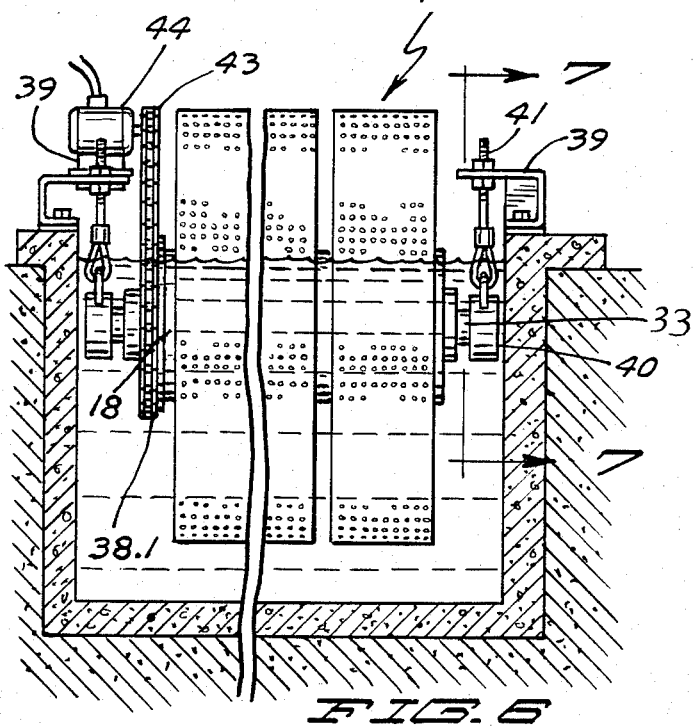
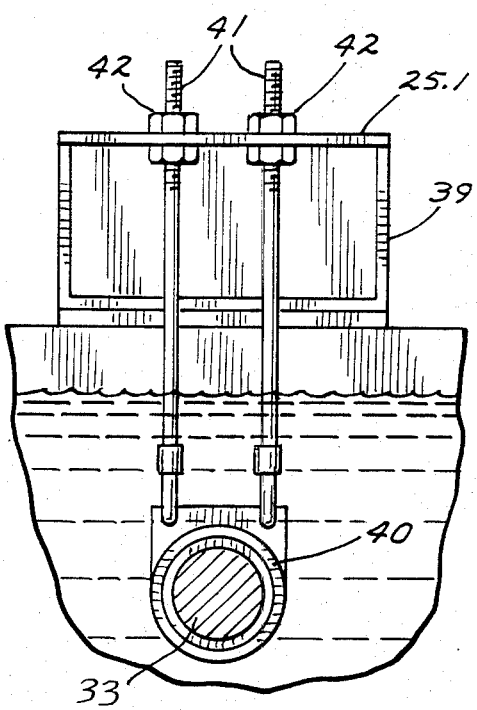

WATER TREATMENT APPARATUS

This invention relates to waste water treatment apparatus and to a buoyant rotary biological contactor.

BACKGROUND OF THE INVENTION

Rotary biological contactors, known as RBCs, have been in rather widespread use throughout the United States in various forms.

An extremely important consideration in such rotary biological contactors is the expected useful life of the rotary biological contactor. In most instances, the rotary biological contactor is intended to be designed for a minimum service life of twenty years and preferably will have an expected service life well in excess of that minimum.

A rotary biological contactor is used with a tank filled with waste water, and provision is made for flow of the waste water into and out of the tank. The rotary biological contactor is located in the tank and has a central shaft, and a plastic media carried by the shaft for rotation therewith, and a driving means for rotating the shaft and plastic media in the tank.

The rotary biological contactor is immersed in the waste water in the tank, and in most cases, the plastic media is submerged in the water and the shaft is out of the water so that the water level is slightly below the rotation axis of the rotary biological contactor. Usually, the rotary biological contactor is approximately 35 to 40% submerged.

In most instances in the past, the shaft of the rotary biological contactor is mounted in bearings which are affixed to the walls of the tank so that the rotary shaft is stationary with respect to the tank. This arrangement is illustrated in the Prosser U.S. Pat. No. 3,886,074, Thissen U.S. Pat. No. 4,115,268, Gass U.S. Pat. No. 3,827,559, and Iwatani U.S. Pat. No. 4,200,532; and is referred to but not illustrated in Holmberg U.S. Pat. No. 3,956,127 at column 3, lines 40–45.

In some instances, the shaft is not supported on the tank wall, but the rotary biological contactor is allowed to float freely in the waste water, with the flotation being supplied by the plastic media, as illustrated in the Holmberg Pat. No. 3,956,127, and in the Carter Biodrum commercial product, which is based upon the Holmberg patent. The Carter Biodrum is manufactured and sold by Ralph B. Carter Company, 192 Atlantic Street, Hackensack, N.J. 07602.

The rotary biological contactors which are known have utilized numerous different types of plastic media on the rotary shaft for rotating through the waste water and building up a bio-mass on the surfaces of the plastic media. In the Prosser Pat. No. 3,886,074, the plastic media is in the form of substantially flat wafers or discs affixed to the shaft; in Gass Pat. No. 3,827,559, the plastic media consists of numerous plastic discs on the square shaft; in Thissen Pat. No. 4,115,628, the plastic media is a long plastic strip spirally wound in spaced convolutions welded together, and in a multiplicity of modules along the length of the shaft; in Holmberg Pat. No. 3,956,127, the plastic media consists of a large number of hollow plastic balls, like ping pong balls, confined in a cage secured to the shaft; and in Iwatani Pat. No. 4,200,532, the plastic media includes hollow plastic balls, which are apertured or pierced, so that the waste water may be both inside and outside of these walls. In all such plastic media, the wafers or discs convolutes or balls a multiplicity of passages are provided to alternately receive and discharge air and water.

The drive for revolving the rotary biological contactors is provided in numerous forms, such as in Iwatani Pat. No. 4,200,532, the shaft extends beyond the tank wall and is driven from a motor by a chain and sprocket drive transmission. In Prosser Pat. No. 3,886,074, the rotary biological contactor is rotated by bubbling air arising in the tank of liquid and being captured in pockets on the revolving rotary biological contactor. In Holmberg Pat. No. 3,956,127 and in the Carter Biodrum, drive is provided by a motor connected to a sprocket on the shaft of the rotary biological contactor, and adjacent a shaft positioning arm which is free to swing up and down as the rotary biological contactor floats freely in the liquid in the tank.

The extremely important service life of the rotary biological contactors is highly important because the rotary biological contactors are extremely expensive and must operate continuously, day and night, for many years, preferably without any service at all.

Problems have been encountered in the rotary biological contactor shafts which are mounted in bearings at their ends, wherein the shafts will fracture, as to render the whole rotary biological contactor useless. Such fracturing occurs because the shaft carries a substantial amount of weight, and extends the whole length of the tank. As a result, the shaft, mounted in end bearings, will continuously flex, during each revolution, and in time, the flexing causes the shaft to fail, by cracking and breaking. The answer to this in response to such shaft failure has been to put more steel into the shaft, thus attempting to make it stronger and less likely to fail. However, shaft failures continue to occur because the flexing of the shafts continues.

Hollow shafts such as seen in Thissen Pat. No. 4,115,268 provide some improvement because they are larger in diameter and tubular in construction, thus resisting flexing to a greater degree.

Such shaft flexing is accentuated under certain circumstances, due to non-uniform build-up or distribution of the heavy bio-mass on the surface of the plastic media. The bio-mass may be non-uniform as between one end of the media and the other end of the media, or non-uniform along the length of the plastic media. Similarly, the bio-mass may be non-uniform at one side of the plastic media as compared to the other side of the plastic media. Such side to side non-uniformity may be caused by unintended shut down of the processing unit, caused by accidental power failure, or similar causes. If the rotary biological contactor is stopped for a period of time, the bio-mass exposed to the air may dry out and flake off the plastic media, whereas the portion of the bio-mass immersed in the waste water tank will remain wet and heavy, with the result that when the rotary biological contactor is again started, one side will be substantially heavier than the other, causing significant asymmetric loading of the shaft.

In rotary biological contactors with stationary bearing-mounted shafts, such as in the Gass patent, the side to side non-uniform bio-mass tend to cause oscillatory vertical forces and unusual torques on the shaft which contribute materially to shaft and media deterioration and failure.

Failure of the shafts also occur in the free floating rotary biological contactors as illustrated in Holmberg Pat. No. 3,956,127, and commercially embodied in the Carter Biodrum, which has a single shaft extending through two adjacent buoyant rotary biological contactors (with plastic balls); and the shaft being driven with the chain and sprocket drive at a location between the two rotary biological contactors.

Failure of the shafts in the Holmberg rotary biological contactors and in the Carter Biodrum rotary biological contactor will occur due to such non-uniform build-up of the bio-mass on the rotary biological contactors so that one end carries a greater weight of bio-mass than the other end, so that one side of the rotary biological contactor has a substantially greater bulk of bio-mass than the other side.

In the free floating rotary biological contactors as in the Carter Biodrum and Holmberg Pat. No. 3,956,127, if one end of the rotor is more heavily laden with bio-mass than the other end, then one of the rotors will tend to float higher in the tank of waste water, and the other end will tend to be submerged further into the water. The center arm, between the two cages, which tends to hold the shaft provides restraint against one end raising and the other end lowering, with the result that the two ends of the shaft extending through the two rotary biological contactors, act as flexing cantilever arms, and they will flex during each revolution of the rotor, and eventually cause fracturing and failure over a period of time. This flexing of the shaft in the free floating rotary biological contactors is accentuated if the bio-mass becomes non-uniform in a direction transverse to the rotation axis, whereupon the rotary biologicial contactors will tend to oscillate upwardly and downwardly, or bounce, as they revolve in the tank of the waste water, and this bouncing, or vertical oscillation of the rotary biological contactors accentuates the flexing of the shaft, contributing in a greater degree to failure of the shaft.

The non-uniform build-up or distribution of the bio-mass on the plastic media also has a tendency to cause deterioration of the plastic media, in addition to the deterioration of the steel shafts. In such disc type plastic media as illustrated in Prosser Pat. No. 3,886,074 and Gass Pat. No. 3,827,559, if the bio-mass is non-uniformly distributed in a direction transversely of the rotation axis, the torque applied from the shaft onto the plastic media requires a greater strain to be applied to the plastic media in certain areas of the plastic media as compared to other areas. This non-uniform application of stress in the plastic media also causes flexing of the media and eventual deterioration and failure of it as by cracking and breaking.

The rotary biological contactors which are free floating, such as Holmberg Pat. No. 3,956,127 and the Carter Biodrum, will accommodate the overall build-up of greater quantities of bio-mass on the plastic media, and the rotary biological contactors are permitted to submerge to the extent that 60% of the rotary biological contactor may be immersed in the waste water. However, when this situation occurs, the central portion of the plastic media, that is, the plastic balls in the cage closest to the shaft, are never permitted to arise from the waste water in the tank and be exposed to air. The failure of a portion of the plastic balls or plastic media to be exposed to air defeats the purpose of the rotary biological contactor, and does not permit the rotary biological contactor to function as it is intended to function.

In summary, the rotary biological contactors which have been used by commercial and municipal was water treatment systems have experienced a substant frequency of shaft failures, both in shafts which are solidly mounted in bearings at their ends above the water level; and in shafts of rotary biological contactors which are free floating under the buoyant effect of the plastic media which permits the rotary biological contactors to vary the degree of submergence in the waste water.

Further, in summary, the existing rotary biological contactors used in many commercial and municipal waste water treating systems cause excessive deterioration of the plastic media, and permit central portions of the plastic media to remain submerged at all times if there is a significant build-up of bio-mass on the buoyant plastic media. Such buoyant plastic media as plastic balls drastically reduce the surface area upon which the bio-mass may build-up because all of the inside faces of the plastic balls remain concealed and isolated from the waste water.

SUMMARY OF THE INVENTION

An object of the invention is to provide a waste water treating apparatus with an improved rotary biological contactor which has a maximum of service life, permitted by correcting the causes of deterioration and failure of the shaft and plastic media of the rotary biological contactor.

Another object of the invention is to provide a novel rotary biological contactor constructed to minimize the likelihood of shaft deterioration and failure by minimizing the loading of the shaft and also minimizing the flexing thereof in normal operation.

Another object of the invention is to provide a new and improved rotary biological contactor with an extended service life by minimizing the effects of non-uniform build-up or distribution of the bio-mass on the plastic media.

Still another object of the invention is the provision of an improved rotary biological contactor which will improve the water treating process and will more nearly neutralize the weight of the bio-mass which builds up on the plastic media.

A feature of the invention is a rotary biological contactor having a tubular shaft of significant diameter, in the range of 36 inches to 48 inches or more, and with closed ends confronting the ends walls of the tank. The shaft is buoyant and terminates in spaced relation to the tank walls. A significant portion of the buoyant shaft is submerged in the waste water and has a substantially non-buoyant plastic media (specific gravity of 0.95) distributed along the length of the shaft. In many installations, the buoyant shaft is almost entirely submerged.

Preferably, the plastic media comprises a plurality of modules of plastic strips spirally wound around the shaft and provided with plastic spacers to maintain the convolutions of the spiral strip spaced from each other in each of the modules, thereby allowing free flow of waste water through and between the modules and convolutions thereof.

The rotary biological contactor has the buoyancy provided by the tubular shaft which is confined against horizontal migration transverse to the rotation axis by a vertical track stationary with the tank wall, and is also confined against longitudinal movement.

Most of the weight of the rotary biological contactor is supported by the buoyancy of the tubular shaft. A relatively small proportion of the weight of the rotary biological contactor is carried by mechanical supports stationary with the end walls of the tank and engaging the ends of the shaft adjacent the tank end walls.

The mechanical shaft supports cooperate with the buoyancy of the shaft itself to locate the rotary biological contactor at the desired depth or degree of submergence in the waste water of the tank. The rotary biological contactor preferably has the top of the periphery of the tubular shaft at the surface of the water.

The mechanical supports for the rotary biological contactor shaft may be adjustable vertically as to vary the relative proportions of the weight of the rotary biological contactor carried by the waste water due to buoyancy of the shaft, and the mechanical supports. This varying the proportion of weight supported permits the degree of submergence of the rotary biological contactor to be changed, or controlled as desired. The adjustability of the shaft supports is significant in cooperation with the tubular shaft which provides buoyancy for the rotary biological contactor wherein the plastic media is substantially non-buoyant.

The shaft supports may take various forms, and in one simple form, vertical tracks on the tank end walls have apertures through which support pins may be extended at the desired elevation to underlie brackets and bearings or bushing sleeves on the ends of the shaft. In another form, the shaft supports may be hangers embracing the ends of the shaft and suspending the shaft from overhead brackets or fixtures; and such hangers may be extendable and retractable for varying the degree of submergence and the relative proportion of support supplied by the buoyancy of the shaft and the stationary hangers. Such hangers may incorporate indicators of the amount of weight being carried to accommodate the necessary adjustment. Alternately, the vertical position of the support brackets may be adjusted by use of shims.

The buoyant shaft has a size, in anticipation of the expected load of the plastic media and the bio-mass thereon, as to provide sufficient buoyancy so that the shaft will be slightly submerged in the waste water. Accordingly, the mechanical support need only provide a minimum of support necessary to bring the top extremity of the buoyant shaft to the surface of the water, so that in normal operating conditions, the topmost portion of the buoyant shaft periphery will be at the surface of the water in the tank. As a result, the plastic media is entirely drained of water during each revolution to thereby expose all portions of the bio-mass on the media to air during every turn.

Another feature of the invention is to provide a drive for the rotary biological contactor at its outer periphery. A ring gear is attached to the rotary biological contactor, and affixed to the shaft; and a pinion gear is stationary with the tank wall and meshed with the ring gear, and is rotatably driven from a source of power to revolve the rotary biological contactor in the tank. Alternately, the toothed ring gear on the shaft of the rotary biological contactor may be in the form of a sprocket, embraced by a drive chain and driven from a motor.

The combined support for the rotary biological contactor in the buoyancy of the shaft, together with the mechanical supports, minimizes the stress placed upon the shaft and the flexing of the shaft, while also predictably locating the rotary biological contactor in the tank so that the simple drive can be effective.

The present invention provides the advantages of minimizing the fatigue stress on the center line shaft and on the plastic media. The tubular shaft which provides the buoyancy has the minimal tendency to flex and thereby avoids the deterioration and failure that has been a constant source of problems and irritation in past rotary biological contactors. The use of the substantially non-buoyant media on the buoyant shaft permits submergence as to permit maximizing of the degree of submergence of the plastic media in the waste water of the tank. By sharing the support of the rotary biological contactor between the buoyancy of the tubular shaft and the mechanical supports on the tank end wall, the effect of the non-uniform build-up and distribution of the bio-mass, both in longitudinal direction and transversely of the rotation axis, is minimized. Tilting of the rotary biological contactor due to non-uniform biomass along the length of the rotary biological contactor is restrained by the end supports for the shaft; and the non-uniform build-up or distribution of the bio-mass transversely of the axis is also minimized in its effect by the restraint on the ends of the shaft while the principal support for the rotary biological contactor is provided by the buoyancy of the shaft. The relative proportion of support provided by the buoyancy of the shaft and by the mechanical supports accommodates varying the degree of submergence of the rotary biological contactor in order to accommodate wastes of various natures as may be experienced in the waste water from time to time.

BRIEF DESCRIPTION OF DRAWINGS

FIG. 3 is an enlarged detail elevation view with portions broken away for clarity of detail and showing the mounting of the drum.

FIG. 4 is an enlarged detail section view taken approximately at 4—4 of FIG. 1.

FIG. 5 is an enlarged detail section view taken approximately at 5—5 of FIG. 1.

FIG. 6 is a detail section view with substantial portions broken away and showing an alternate form of the invention.

FIG. 7 is an enlarged detail section view taken approximately at 7—7 of FIG. 6.

DETAILED SPECIFICATION

Figure 1:
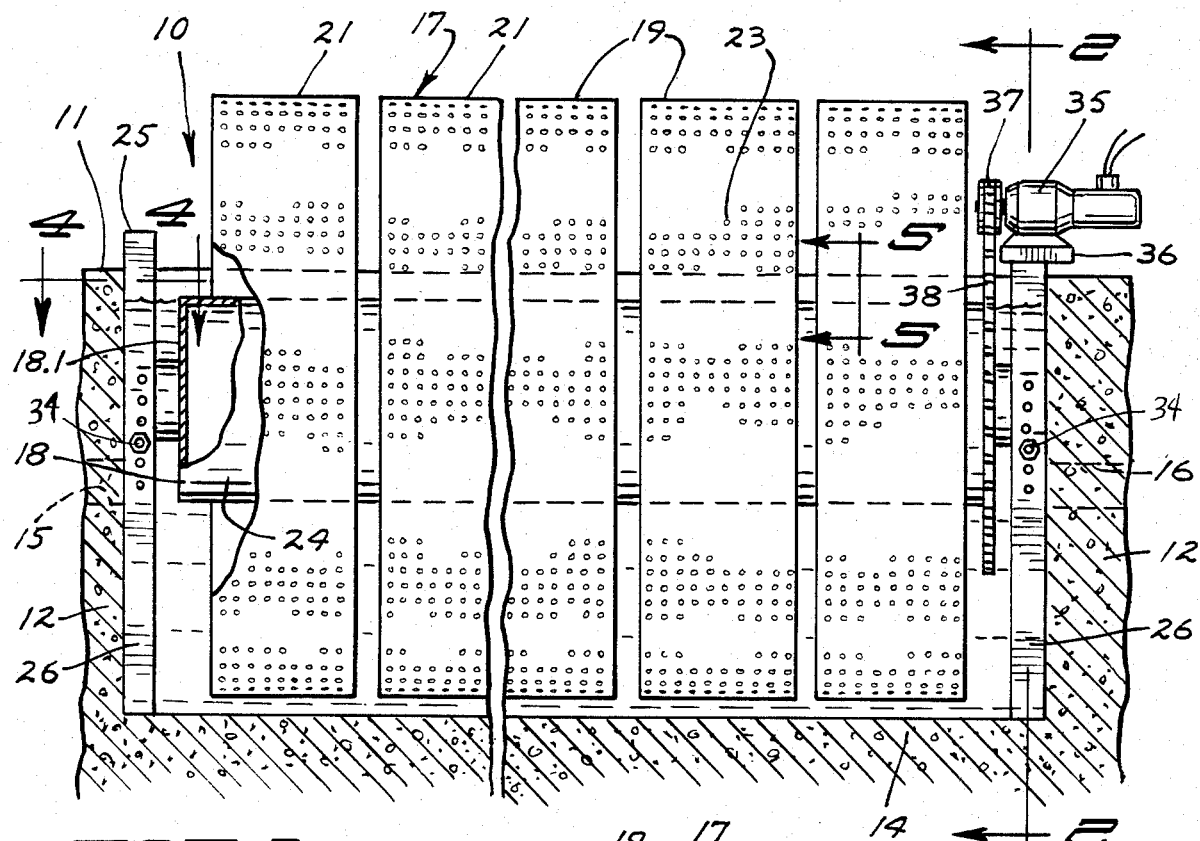
FIG. 1 is a vertical section view through the tank and taken at 1—1 in FIG. 2 and showing the rotary biological contactor in elevation and partly broken away for clarity of detail.

The waste water treating apparatus, indicated in general by numeral 10, includes a tank 11 made of concrete and having upright end walls 12 and sidewalls 13 and a bottom 14. The tank has an inlet 15 in one end wall and an outlet 16 in the other end wall to provide for circulation of waste water therethrough. Suitable valving connected with the inlet and outlet will maintain the depth of the waste water in the interior of the tank as desired.

In the tank 10, there is a rotary biological contactor, indicated in general by numeral 17, which assists in the treating of the waste water by progressively exposing the waste water to air as the contactor 17 revolves.

The rotary biological contactor has two major components, an elongate cylindrical drum or hollow shaft 18 and a plastic media 19 on the drum and extending entirely around the drum, substantially throughout the entire length of the drum. The plastic media may take any of a number of forms, and it is important that the media have a multiplicity of open and unobstructed passages 20 which are alternately filled and purged of water and air during each revolution of the contactor.

Furthermore, it is important that the media have as much surface area as possible which is wetted and drained during each revolution, to thereby expose of much of the waste water to the air as is possible. The plastic media 19 may take any of a number of forms and the specific gravity of the plastic in the media should be nearly the same as water, and a preferred form of plastic material has a specific gravity of 0.95.

The plastic media should be substantially rigid in its operating condition, and may have a thickness of approximately 1/16th of an inch (0.0625 inches). In the form illustrated, the plastic media 19 is arranged in a multiplicity of separate modules 21 each substantially identical to all of the other modules and spaced slightly from each other along the length of the shaft or drum 18. In the form illustrated, each of the modules comprises an elongate strip 22 of plastic having a multiplicity of indents or receptacle shaped deformities 23 therein. The elongate strip 22 of plastic is rigidly secured to the outer peripheral wall 24 of the drum or shaft 18 and is wound in a spiral or convolute around the drum with a multiplicity of turns so that the radial thickness of the module may be approximately the same as the diameter of the drum 18. In one preferred form, the rotary biological contactor 17 has modules 21 with a diameter of approximately 12 feet and with a drum or shaft 18 with a four foot diameter.

The strip 22 of plastic is progressively welded to itself as the modules 21 are formed so that adjacent turns in the convolute are rigidly affixed to each other, thereby rendering each of the modules 21 an integral and rigid structure which is honeycombed with passages 20 extending both axially between adjacent turns of the plastic strip 22 and also extending circumferentially. The plastic media is substantially the same as that illustrated and described in my earlier Pat. No. 4,115,268.

The shaft or drum 18 is essentially rigid and hollow and has closed ends 18.1 which confront the tank end walls 12.

The shaft or drum 18 has substantial buoyancy for the purpose of contributing materially to the support of the rotary biological contactor 17 in the tank 11. However, the shaft or drum 18 has insufficient buoyancy as to float the rotary biological contactor at the desired elevation in the pool of water in the tank, and would normally provide sufficient buoyancy as to support the rotary biological contactor, but an elevation such that the entire periphery of the drum or shaft 18 is immersed, and also allowing the inner periphery of the plastic media 19 to be entirely and continuously immersed.

The supporting effect of the buoyancy of the shaft or drum 18 is supplemented by mechanical supports which are rigid with the tank walls. In one form, the mechanical supports 25 include, at each end of the tank, a pair of upright channels 26 facing each other and secured by mechanical fasteners to the end walls 12 of the tank. The channels 26 define tracks in which a vertically adjustable subframe 27 is slideably mounted. The subframe 27 has a pair of uprights 29 confined in the channels 26 and affixed as by welding to top and bottom cross members 30 and 31, respectively. The lower cross member 31 carries a bearing 32 which journals the stub shaft 33 which is mounted on the end wall 18.1 of the hollow shaft or drum 18.

The frames or slides 27 are supported at the desired vertical position in the channels 26 by a rod 34 which has threaded ends and extends through one of a number of vertically spaced apertures 35' the channels 26. The rod 34 underlies the crossbar 31 of the slide or subframe 27 and thereby supports the subframe 27, bearing 32, stub shaft 33, and hollow shaft or drum 18 at the desired elevation in the tank. Preferably, the drum or hollow shaft 18 is provided with support by means of the mechanical supports 25 as to supplement the buoyancy of the hollow shaft or drum 18 to the extent that the uppermost portion of the drum periphery 24 is substantially at the surface of the waste water W in the tank. By having the top of the drum periphery at the surface of the waste water, a maximum of the plastic media 19 is immersed in the water while permitting, during each revolution, all of the plastic media 19 and all of the passages 20 to rise out of the waste water during each revolution. Accordingly, all of the passages 20 are completely purged of both water and air during each revolution so that the waste water in these passages is completely changed. As a result, all of the biological organisms in the waste water are exposed to air by rotation of the rotary biological contactor 17.

Rotation of the rotary biological contactor 17 is obtained by a motor 35 on a bracket 36 which is attached to the top crossbar 30 of the sliding subframe 27. The motor 35 has a speed reduction mechanism connected with it, and an output drive gear 37 in fixed relation with the hollow shaft or drum 18. An annular tooth drive or gear 38 is affixed as by welding to one end of the hollow shaft or drum 18, and the gear 37 of the motor drive unit is meshed with the teeth of the annular gear 38 to thereby provide rotation of the rotary biological contactor in the tank.

Figure 2:
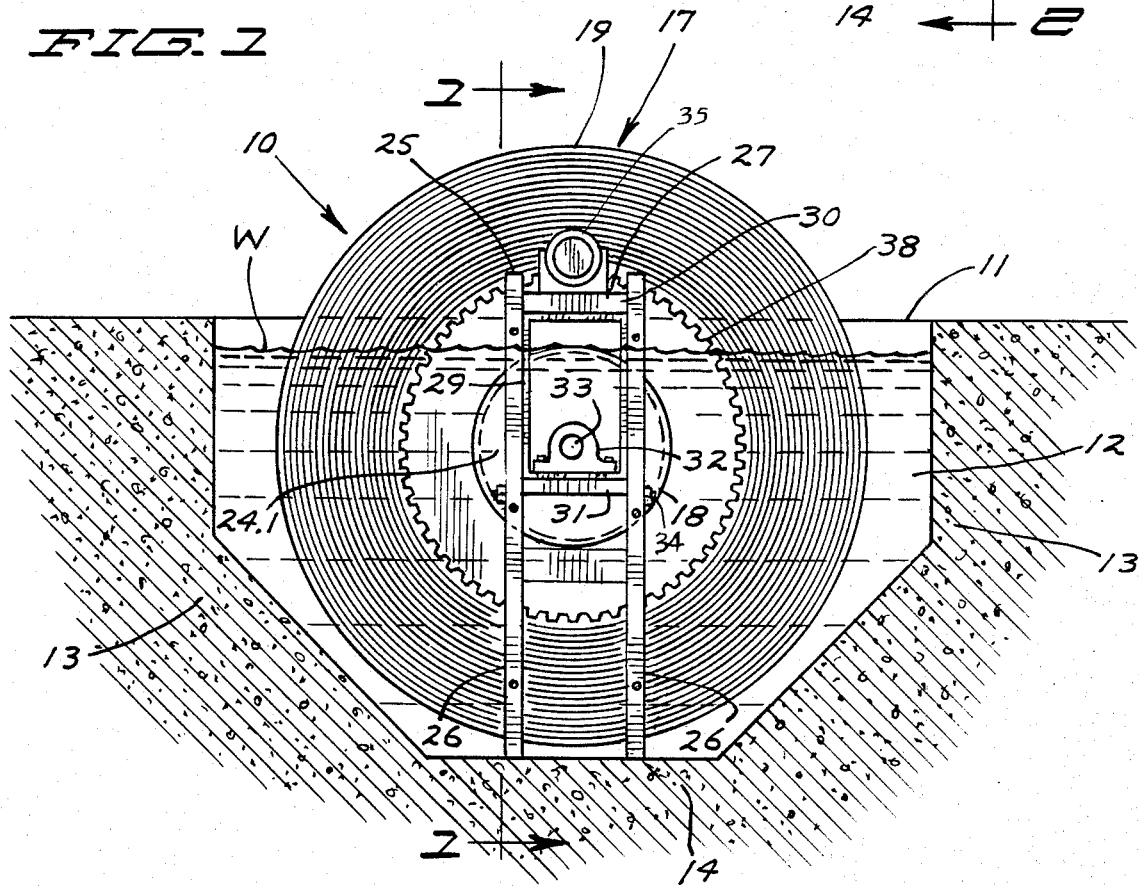
FIG. 2 is a section view taken approximately at 2—2 in FIG. 1.

In the modified form of my rotary biological contactor illustrated in FIGS. 6 and 7, the rotary biological contactor 17 is the same as that illustrated in FIGS. 1–5. In this form, the rotary biological contactor is suspended from brackets 39 affixed to the tank wall rather than being undergirded by the mechanical support 25 of FIGS. 1–5. The mechanical support 25.1 of FIGS. 6 and 7 suspends the bearings 40 from threaded rods 41 which are attached to the bracket 39 by lock nuts 42. By adjusting the position of the lock nuts 42 along the threaded rods 41, the vertical position of the rotary biological contactor in the tank may be adjusted. Also, this form, in FIG. 6, illustrates a slightly modified form of drive for the rotary biological contactor. The tooth drive 38.1 is attached to the end wall of the hollow shaft or drum 18; and in this form, the tooth drive 38.1 has sprocket teeth which are meshed with a drive chain 43 which is also meshed with a sprocket on the motor 44 carried by the bracket 39. In the event the threaded rods 41 are adjusted upwardly or downwardly for adjusting the position of the rotary biological contactor 17 in the tank, it may be necessary to insert shims beneath the motor 44 on the bracket 39 to maintain the proper tautness of the chain. Alternately, an idler sprocket may be utilized for maintaining chain tension.

It will be seen that the waste water treating apparatus utilizes a rotary biological contactor which is, from an overall standpoint, buoyant to derive most of its support in the tank from the buoyant hollow shaft or drum 18. Mechanical supports supplement the support provided by the buoyancy so that the top periphery of the hollow shaft or drum 18 is maintained substantially at the surface of the waste water in the tank, with the effect that there is maximum utilization of the plastic media by thoroughly purging all of the passages of water and air during each cycle of revolution and also with the effect of neutralizing a maximum of the weight of the media on the shaft. Accordingly, the shaft or hollow drum 18 carries only a minimum of weight and the possible flexing of the shaft is minimized, all of which contributes to the efficient operation of the water treating apparatus for a maximum of life span of the equipment.

What is claimed is:

1. Waste water treating apparatus comprising
a tank having an inlet and an outlet and having end and side walls confining the waste water to a predetermined depth in the tank,
a rotary biological contactor in the tank and having a rigid and hollow shaft extending horizontally and also having a water treating plastic media on the shaft to rotate thereon, the media peripherally embracing the shaft and having a multiplicity of gas and water passages alternately filled and purged of gas and water as the media revolves,
the hollow shaft having closed ends in the tank and confronting the tank end walls and also having buoyancy for floating the entire rotary biological contactor in the waste water and with the shaft submerged,
means for rotating the biological contactor in the tank and mechanical supports in fixed relation to the tank end walls and having connections to and engaging the ends of the shaft in the tank and at a submerged location therein, the mechanical supports adding upward vertical support to the buoyancy of the shaft to locate the top of the shaft periphery adjacent the surface of the water, whereby to maximize the treating function of the media as substantially all of the passages are filled and purged of water and gas in each revolution, and to neutralize a maximum portion of the weight of the media while minimizing the tendency of the shaft to flex.

2. The treating apparatus according to claim 1 wherein the mechanical supports include means providing vertical adjustment between the tank end walls and the ends of the shaft.

3. The treating apparatus according to claim 1 and said means including a source of rotary power revolving the contactor in the water.

4. The treating apparatus according to claim 3 and the source of rotary power including a revolving annular toothed driver concentric of the shaft and affixed thereto.

5. The treating apparatus according to claim 4 wherein an upper portion of the toothed driver is out of the waste water and the source of rotary power including a rotary gear meshed with and driving the upper portion of the toothed driver.

6. The treating apparatus according to claim 5 and a sprocket driven chain embracing and meshed with and driving the toothed driver.

7. The treating apparatus according to claim 1 wherein the mechanical supports undergird the ends of the shaft.

8. The treating apparatus according to claim 1 wherein the mechanical supports suspend the ends of the shaft.

9. The treating apparatus according to claim 1 and the entire outer periphery of the plastic media being spaced from the inner surfaces of the tank.

10. A rotary biological contactor for use in a tank of waste water, comprising
an elongate, rigid, hollow and buoyant drum to be immersed in the water and having closed ends to be embraced by the water,
a substantially rigid water treating plastic media extending entirely around the drum and along the length of the drum to be immersed therewith, the media having a multiplicity of passage means alternately receiving and discharging gas and water during each revolution,
the drum having buoyancy for floating the drum and media in the water so that unless the supporting effect of the buoyancy is supplemented, the top of the drum periphery is entirely submerged,
means for rotating the drum and media,
and mechanical supports adapted to be mounted in fixed relation to the tank, the mechanical supports include bearings which engage and journal the ends of the drum thereon at a location which is below the top of the drum periphery and which is submerged in the waste water, the mechanical supports supplementing the buoyancy of the drum and retaining the top of the drum periphery substantially at the surface of the waste water whereby to minimize flexing of the drum between the ends by immersing a maximum portion of the plastic media with the effect of neutralizing a maximum portion of the weight of the media while substantially entirely purging the passage means of air and water in each revolution.

11. The rotary biological contactor according to claim 10 wherein the plastic media has a radial thickness approximately the same as the diameter of the drum.

12. The rotary biological contactor according to claim 10 wherein the plastic media has specific gravity of 0.95.

* * * * *